United States Patent
Mital et al.

(10) Patent No.: US 7,774,713 B2
(45) Date of Patent: Aug. 10, 2010

(54) DYNAMIC USER EXPERIENCE WITH SEMANTIC RICH OBJECTS

(75) Inventors: Vijay Mital, Sammamish, WA (US); Alexander Stojanovic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 11/168,913

(22) Filed: Jun. 28, 2005

(65) Prior Publication Data
US 2006/0294509 A1 Dec. 28, 2006

(51) Int. Cl.
*G06F 3/048* (2006.01)
(52) U.S. Cl. .................. 715/763; 715/769
(58) Field of Classification Search ........ 715/769, 715/762, 763; 704/270; 707/3–5; 717/105, 717/108, 109, 111
See application file for complete search history.

(56) References Cited

U.S. PATENT DOCUMENTS

| | | | |
|---|---|---|---|
| 5,809,269 | A | 9/1998 | Favot et al. |
| 6,115,646 | A | 9/2000 | Fiszman et al. |
| 6,256,033 | B1 | 7/2001 | Nguyen |
| 7,249,019 | B2* | 7/2007 | Culy et al. .......... 704/257 |
| 7,546,602 | B2* | 6/2009 | Hejlsberg et al. ...... 719/313 |
| 2001/0041980 | A1* | 11/2001 | Howard et al. ........ 704/270 |
| 2002/0007309 | A1* | 1/2002 | Reynar ............ 705/14 |
| 2003/0093551 | A1 | 5/2003 | Taylor et al. |
| 2003/0131338 | A1 | 7/2003 | Georgalas |
| 2003/0132944 | A1 | 7/2003 | Smith |
| 2003/0135659 | A1 | 7/2003 | Bellotti et al. |
| 2004/0015378 | A1 | 1/2004 | Casati et al. |
| 2004/0078105 | A1 | 4/2004 | Moon et al. |
| 2004/0078373 | A1 | 4/2004 | Ghoneimy et al. |
| 2004/0083199 | A1* | 4/2004 | Govindugari et al. ...... 707/1 |
| 2004/0093350 | A1 | 5/2004 | Alexander et al. |
| 2004/0158455 | A1 | 8/2004 | Spivack et al. |
| 2004/0207659 | A1* | 10/2004 | Goodman et al. ........ 345/762 |
| 2004/0249824 | A1 | 12/2004 | Brockway et al. |
| 2005/0022163 | A1 | 1/2005 | Rainer et al. |
| 2006/0277166 | A1 | 12/2006 | Vogler-Ivashchanka et al. |

FOREIGN PATENT DOCUMENTS

WO        WO 0127850        4/2001

OTHER PUBLICATIONS

White, "Building a Business Intelligence Framework for the Smart Building the Smart Business: Connecting People, Processes, and Information," BI Research, http://www.sap.com/solutions/netweaver/businessintelligence/pdf/Misc_BIR_SAP_ BI.pdf, printed May 2004, 20 pages, Germany.

(Continued)

*Primary Examiner*—Kieu Vu
*Assistant Examiner*—Haoshian Shih
(74) *Attorney, Agent, or Firm*—Senniger Powers LLP

(57) ABSTRACT

Semantic rich objects for a dynamic user experience. One or more actions in the process are represented by semantic rich objects (SROs) for exposing functionality of the process. Each of the SROs includes metadata associated with an action and an execution environment therefor. In response to an interactive gesture from a user selecting at least one of the SROs to perform a desired action in the process, metadata is extracted from the selected SROs to determine whether the desired action is available in the execution environment of the process.

18 Claims, 9 Drawing Sheets

OTHER PUBLICATIONS

Nigam et al., "Business Artifacts: An Approach to operational specification," http://www.research.ibm.com/journal/sj/423/nigam.html, Jul. 18, 2003, 18 pages, USA.

"Developer Suite: The Development Toolkit for the Business Objects BI Platform," http://ch.businessobjects.com/produits/devs/default.htm, last available Oct. 11, 2004, 3 pages, USA.

Mosher, "A New Specification for Managing Metadata," http://java.sun.com/developer/technicalArticles/J2EE/JMI/, Apr. 2002, 5 pages, USA.

"Apple-Mac OS X—Spotlight," http://www.apple.com/macosx/features/spotlight/, printed Jun. 2, 2005, 3 pages, USA.

"Apple-Mac OS X—Automator," http://www.apple.com/macosx/features/automator/, printed Jun. 2, 2005, 2 pages, USA.

Unknown, "SAP to acquire TopTier", Mar. 30, 2001, 2 pages, http://www.sap.com/company/press/press.epx?pageview=print&pressid=2, Walldorf, Germany.

Unknown, "PARTS for Java Professional Edition by ObjectShare," printed Aug. 12, 2005, 3 pages, http://jdj.sys-con.com/read/36071_p.htm, USA.

Unknown, "ObjectShare supports Microsoft Application Foundation Classes (AFC) in the Next Version of PARTS for Java," Apr. 9, 2005, 2 pages, http://www.prwire.com/cgi-bin/stores.pl?ACCT=105&STORY=/www/story/87269, USA.

Unknown, "VisualAge Smalltalk," printed Jun. 29, 2005, 1 pages, http://www-306.ibm.com/software/awdtools/smalltalk/, USA.

Unknown, "Squeak—the ultimate tool for the advanced information worker," printed Jun. 29, 2005, 5 pages, http://www.viscoracle.com/doc/sqeak-review.html, USA.

Keen, Martin and Vilaghy, Tamas, "VisualAge for Java," "From code to deployment: Connecting to CICS from WebSphere V4.01 for z/OS," Chapter 2, May 2002, 26 pages, "IBM International Technical Support Organization," USA.

Searle, John R., "Speech Acts: An Essay in the Philosophy of Language," 1969, 19 pages, Chapter 2, Cambridge University Press, Great Britain.

Unknown, "Dashboard," Apple—Mac OS X—Dashboard, printed Aug. 12, 2005, 3 pages, http://www.apple.com/macosx/features/dashboard/, USA.

Unknown, "What is Konfabulator?," Information, printed Aug. 12, 2005, 2 pages, http://www.konfabulator.com/info, USA.

Agesen, et al., "The SELF 4.1 Programmer's Reference Manual," 2000, 108 pages, Sun Microsystems, USA.

* cited by examiner

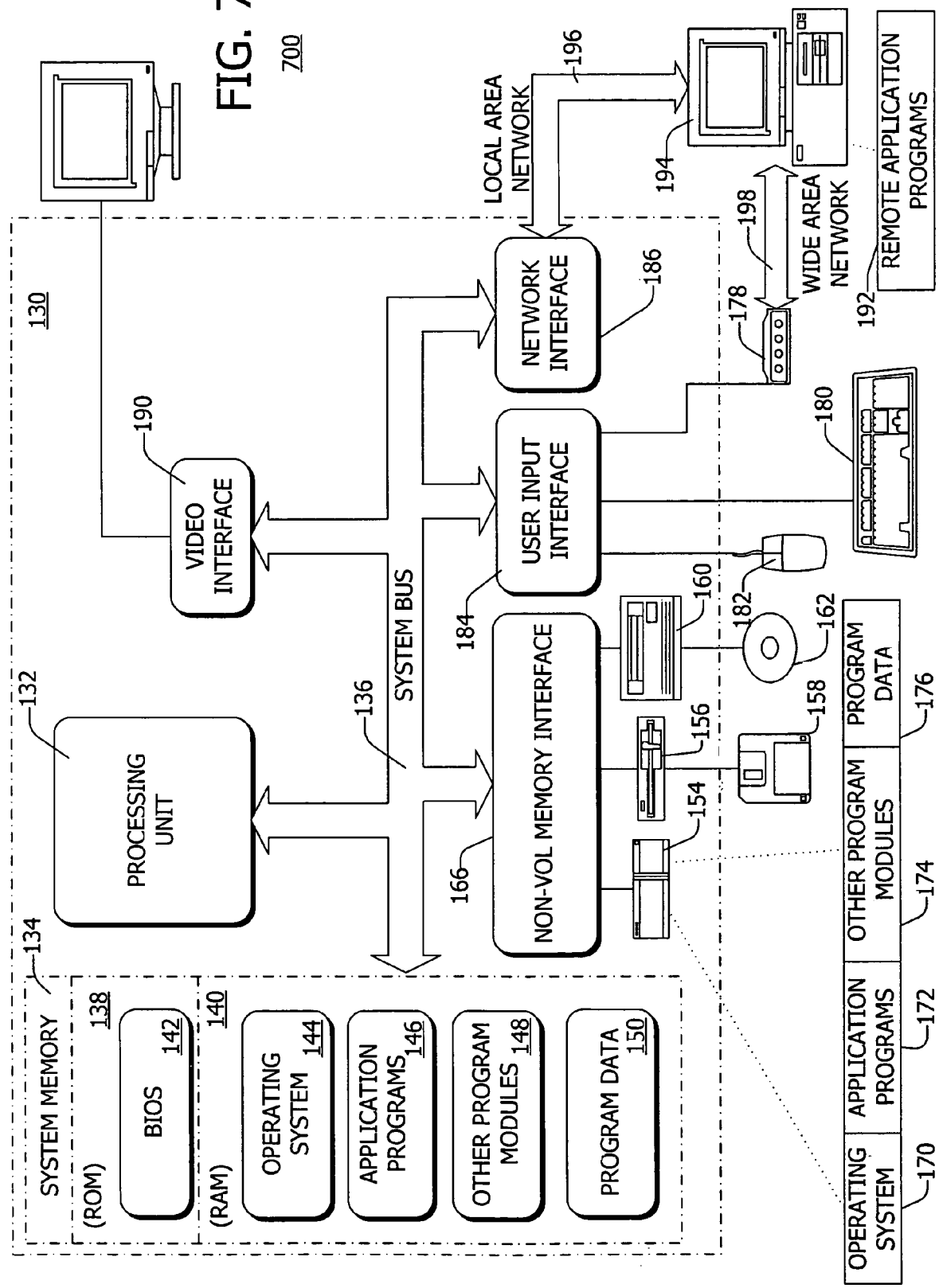

DYNAMIC USER EXPERIENCE WITH SEMANTIC RICH OBJECTS

BACKGROUND

Users often interact with computer application programs through a series of form-based operations or actions to access the functionalities of the application programs. For example, upon selecting an icon object on a computer display using an input device, such as a mouse, the user may be presented with a menu of options. The user may then select one of the options to interact with the selected icon object using functionalities of the application programs (e.g., "copy" highlighted text or "send" a selected document to an email recipient). As such, the set of menus becomes an entry point of the user's experience to the application programs. Presently available user interface design disadvantageously limits the user to only those displayed options because the applications typically include other functionalities that are not presented to the user. Consequently, the user cannot see what the form designer/developer did not code or present on the current user interface design. In order to show all or most of the functionalities of the application, user interface designers or developers currently need to hard-code the functionalities.

For example, business applications use forms, navigations, query interfaces, and other special user interface (UI) artifacts to create a desired user experience. The design of the UI artifacts determines the entry points for users into the application state and behavior. Unfortunately, the design of the UI artifacts also limits these entry points. Further to the example, workflow applications typically expose tasks to user in forms dedicated to the particular task instances (e.g., form for "approve this order" task). Thus, users may be unable to know as much about a particular task as they would like (e.g., "What happens if the task is skipped? Are there other outstanding tasks related to this one?"), which complicates collaboration and sharing of information.

Some existing systems attempt to enhance the standard or default menu of options by providing a list of short-cut keys or tips to allow the user to further interact with the application programs. However, these enhanced options are usually presented in a separate list and only statically extend the default options while forcing the users to remember more non-user friendly shortcut keys.

Currently available workflow applications provide limited default options in their dedicated task UIs. Some other systems purpose-built and UIs provide access the other functionalities of the applications through custom-codes or customizations. In the workflow example, additional information may be custom-coded for a dedicated task UI but the UI designer cannot possibly anticipate every possible combination or direction that the user may want to explore in connection with a dedicated task UI. Therefore, in addition to being overly cumbersome at times, these custom-codes or customizations usually do not cover all available functionalities and are static in nature such that the customizations have specific and limited usages.

Presenting adequate functionality to the user is particularly problematic in devices, such as mobile devices with small form factors, that have difficulty supporting traditional "verbose" forms (i.e., forms in which headers and frames contain relatively large amounts of spatial and textual information). Verbose forms include, for example, buttons, navigation bars, parent-child tables in which the child table moves in synchronization with a selection in a parent table, etc. As such, it is difficult to notify users of both the character of the information they are interacting with, and the behaviors available from the underlying business applications around the information. The ability to address the information by means of speech commands is increasingly important.

Speech commands allow users to address a larger number of possibilities (i.e. sentences) than do traditional visual forms. Although audio interface systems, such as speech recognition systems, provide sets of basic functions, users do not necessarily know which functions are available to them. For example, in a conventional automated customer service system, a user may receive a set of options via a set of pre-recorded human voice. The user may be asked to speak to a telephone headset which type of customer services he or she wishes to access. As an illustration, suppose the user wishes to speak to a customer representative regarding her bill. Initially, the user may be prompted by an automated voice system to choose which areas of service she is calling about: "account billing", "adding services", "technical support", or "other" services. In this instance, the user may respond to the voice prompt by stating the desired services. After this initial selection, the user would receive a further or a cascading set of options presented to the user before she may be directed to speak to a live customer representative directly. In many instances, existing audio interface system allow the user to bypass the presented options and reach a live-person customer service by speaking "agent", "representative", or "talk to an agent". However, this "hidden" shortcut is usually not apparent to the user even though the audio interface systems have capabilities to perform such action.

SUMMARY

Embodiments of the present invention overcome the shortcomings of prior systems by exposing capabilities available to the user from the underlying data sources and applications using metadata through semantic rich objects (SROs). In addition to what is available to a user through a single SRO, the metadata includes information that enables the determination of what is available to the user via different combinations of SROs exposed by the same or different applications and data sources. Alternative embodiments further allow the user to determine how to use the SROs in combination. The exposed functionalities of actions may be combined and used by the user in a convenient manner to further expose the actions and functionalities of the application program. According to an aspect of the invention, metadata in an SRO may be extracted and combined with metadata from another SRO such that the user may be presented with actions according to semantic rules (e.g., "Share this document with John and place it on his calendar on Jul. 1, 2005 at 10:00 am".) in addition to discrete, single actions (e.g., copy, paste, or the like).

Advantageously, through the exposed metadata in SROs, embodiments of the invention provide actions of application programs to the users in a plain sentence such that processes in application programs are transparent to the user. Embodiments of the invention also expose instances of SROs having metadata such that applications programs may determine the appropriate and available actions without adhering to a standard or static user interface (UI) configuration.

In other words, aspects of the invention provide a full solution to the problem of custom logic in UIs determining and limiting users' ability to fully access the richness of the behavior and insights available from business applications and the like. Aspects of the invention also reduce the amount of code needed in conventional form-based UI design by increasing the semantic richness of the actions projected by the underlying applications and data sources.

Alternatively, the invention may comprise various other methods and apparatuses.

Other features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 7 is a block diagram illustrating one example of a suitable computing system environment in which the invention may be implemented.

Figure 1:
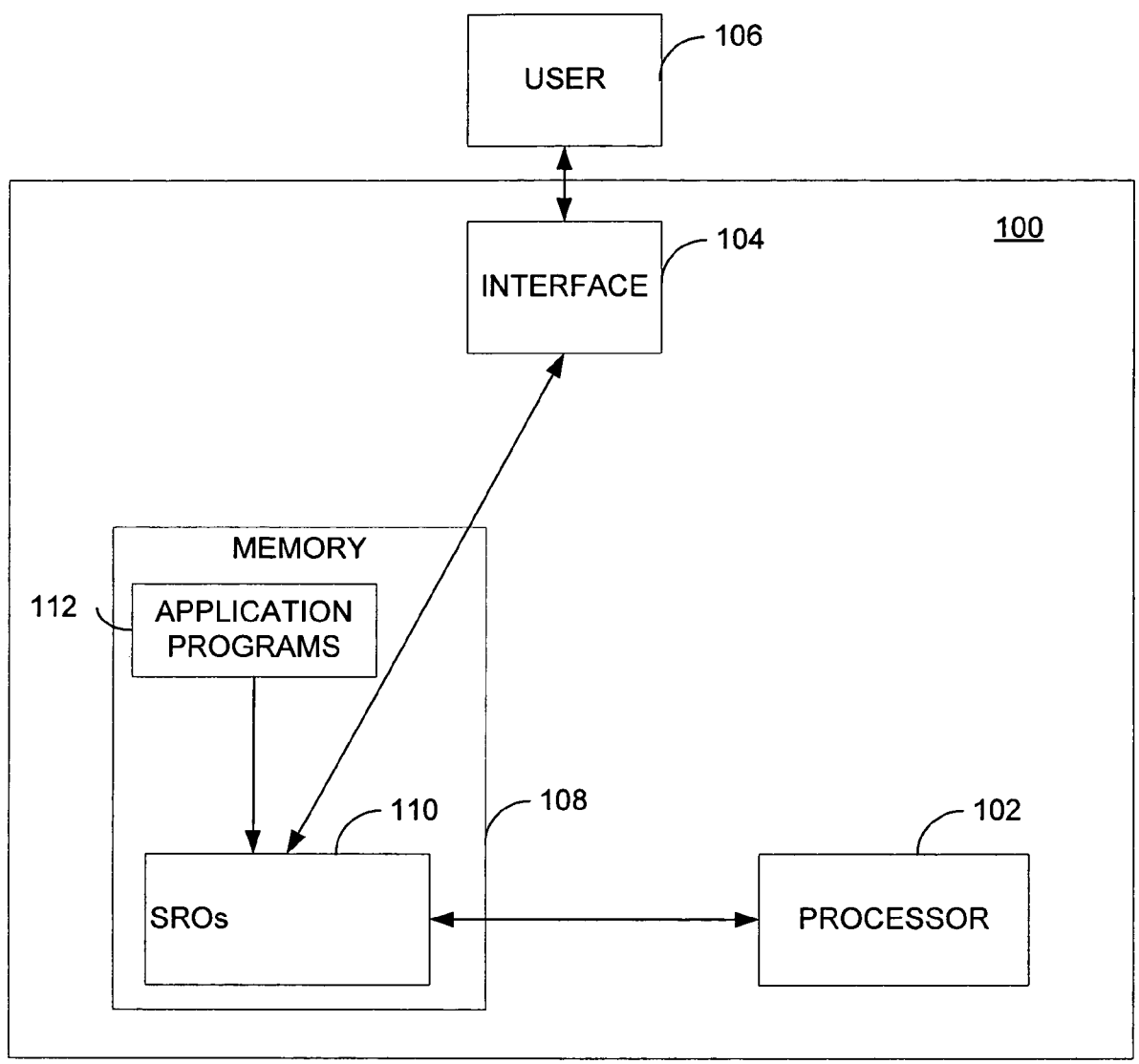
FIG. 1 is an exemplary diagram illustrating a system for providing a dynamic user experience within a process using semantic rich objects (SROs) according to one embodiment of the invention.

Appendix A describes examples of speech acts according to one embodiment of the invention.

Corresponding reference characters indicate corresponding parts throughout the drawings.

DETAILED DESCRIPTION

Referring first to FIG. 1, a block diagram illustrates a system 100 for providing a dynamic user experience within a process using semantic rich objects (SROs) according to one embodiment of the invention. For example, the system 100 may be a computing system such as a computer 130 in FIG. 7, a computing device, a computer server, a plurality of computer servers, or other computing device that is capable of executing computer-executable instructions, applications, application software, application programs 112, computer-executable routines or codes. In another embodiment, system 100 includes computing devices in a distributed system in which the computing devices are connected by a common communication network, such as an intranet, an internet, or the like.

Still referring to FIG. 1, system 100 includes a processor 102 associated with an interface 104. The processor 102 processes instructions or commands from a user 106 via the interface 104 and executes computer-executable instructions, routines, applications, application programs, or the like. The interface 104 receives an interactive gesture from a user 106. For example, the interface 104 may be a display, such as the display shown in FIG. 7, and the user 106 may use an input device, such as a mouse 182 or a keyboard 180, to select one or more objects displayed on the display. In another embodiment, interface 104 may be an audio device coupled to a voice recognition system to provide interactive audio dialog with user 106 such that user 106 may respond to audio prompts audibly.

The system 100 also includes a memory 108 which may be a volatile, non-volatile, a system memory 134 or a non-volatile memory interface 166 of FIG. 7, or other computer-readable medium for storing data that may be transmitted across a common communication network, such as an internet, an intranet, or other types of communication networks.

In one embodiment, the memory 108 stores a plurality of semantic rich objects (SROs) 110 including metadata which are projections of actions and data state within application programs 112. For example, application programs 112 may include actions, functions, operations, or the like to perform a task or handle an event, and may also hold data (see further discussion with respect to FIG. 2) about the subject matter of the task (e.g. that a task is about processing a particular order for a certain customer). As an illustration, a workflow management application program handles workflow processes which involve assignment of tasks, delegation of tasks, or the like. A communication software may include actions such as facilitate communications between two parties (e.g., sending electronic mails, sharing documents among parties, or the like), or provide messaging services. As another illustration, a multimedia software may include actions such as organizing media objects (e.g., audio files, still picture files, or motion picture files), or communicating media objects with another person.

Currently, a set of static form-based user interfaces presents actions within these application programs or processes to the users. For example, many known UIs have standard sets of high level menu options such as "File, Edit, Tools, or Help" for the users to select. Each of these high level menu options further provides additional options. Further to the example, a high level "File" menu option may include "Open, Save, Exit, Print", or other sub-options. Overall, the user is required to learn these different discrete menu options to be familiar or interact with application programs 112 or processes. This learning experience would be similar to learning a new language; learning the vocabularies and grammatical or logical rules (e.g., "Open" option is a sub-menu of "File", not "Edit", etc.) before interacting with application programs 112.

Advantageously, embodiments of the invention employ metadata representing actions within application programs 112 or processes such that a set of available or appropriate actions may be presented to the user depending on the user's selection and in a plain sentence or semantic format. In an alternative embodiment, the set of available or appropriate actions is selectively provided or presented to the user based on the context or the execution environment of the application programs 112. Referring again to FIG. 1, an SRO is an item or object provided to the user for direct manipulation, inspection, or sharing in an execution environment, such as system 100. Alternatively, an SRO may be provided to the user through a medium such as a form that may restrict or enrich the behavior available from the SRO. In one embodiment, an SRO may be specific to the context or execution environment that user 106 is in direct control. For example, an administrator of a computer network system may be presented with a full set of available functions so as to manage the computer network. On the other hand, a workstation user A may be presented only a small set of options due to the workstation user A's role as a workstation user.

It is to be understood that formed based UI designs may be used in conjunction with or on top of SROs. For example, an UI developer may provide a form, with options to the users, receiving the rich information in the SROs so that the UI developer is not required to code all or some of the options presented in the form. Alternatively, embodiments of the invention employing the SROs reduce the amount of logic coding in the form that the UI developer customarily provide to present and enable the functionalities to the users.

In an alternative embodiment, system 100 stores data including data relating to performance history of the execution of the process of application programs 112, prior user interactions with the execution of the process, and a process execution model in memory 108 such that system 100 may present a set of customary or frequently-used actions to user 106 when extracting metadata from the SROs 110.

Figure 2:
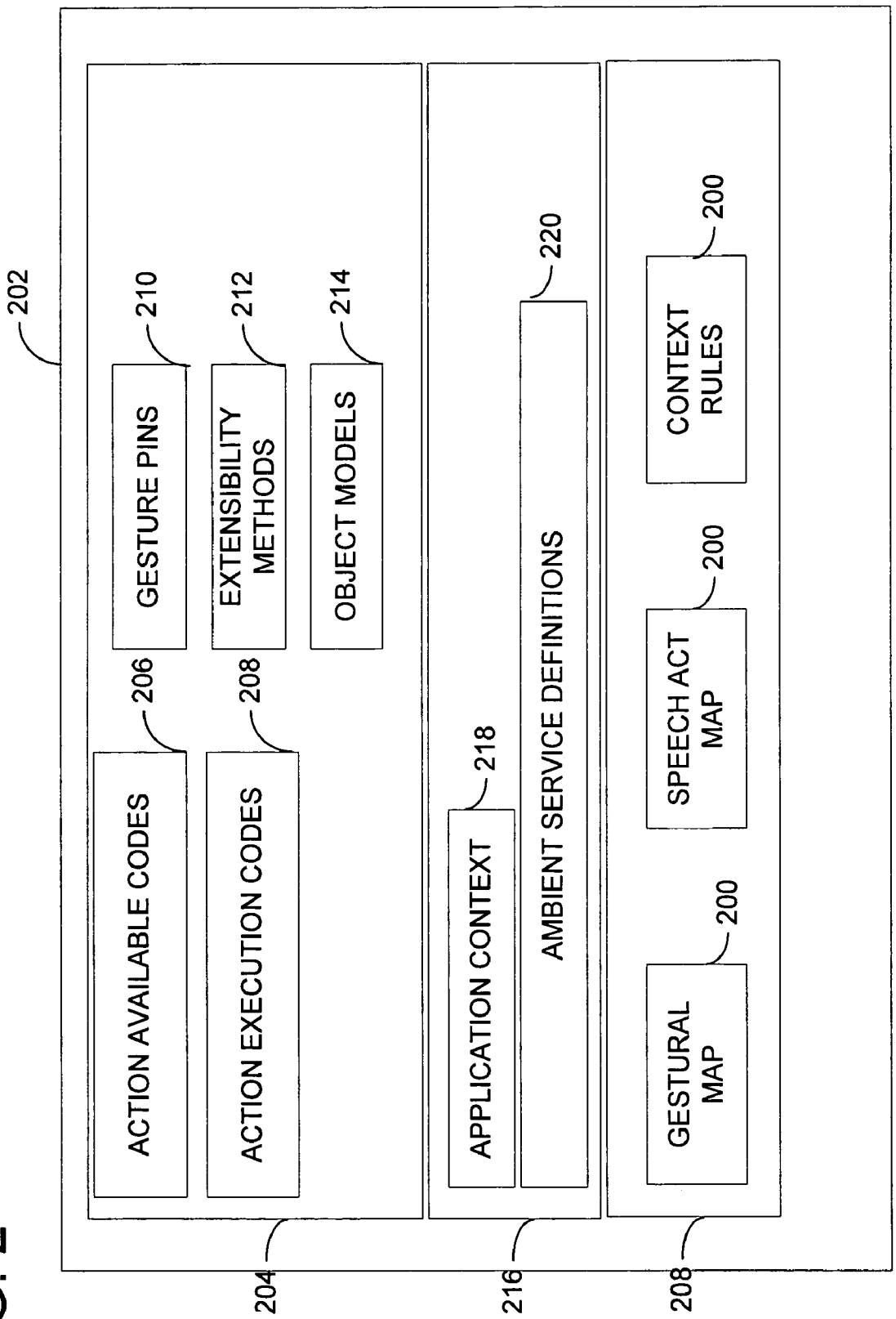
FIG. 2 is an exemplary block diagram illustrating a data structure illustrating a SRO including metadata according to one embodiment of the invention.

Referring now to FIG. 2, a block diagram illustrates a data structure 202 including metadata according to one embodiment of the invention. A first data field 204 includes metadata representing actions associated with a process. For example, the first data field 204 may include metadata relating to action available codes 206, metadata relating to action execution codes 208, metadata relating to gesture process identification numbers (PINS) 210, metadata relating to extensibility methods 212, and metadata relating to object models 214.

The data structure 202 also includes a second data field 216 including metadata representing an execution environment of the process where the first data field is associated with said second data field to define a set of available actions to be performed in the execution environment of the process. For example, the second data field 216 may include metadata relating to application context 218 and metadata relating to ambient service definitions 220. For example, ambient service definitions 220 include metadata relating to data matching an interactive gesture to an implementation of an action of the process or the application programs 112. For example, suppose the application program 112 or the context of an SRO is a web application service that executes computer-executable instructions in assembly programming language. In this example, the ambient service definitions 220 may provide metadata relating to a given interactive gesture and its corresponding assembly language to be executed by the web application service.

In another embodiment, the application context 218 also includes data relating to context or execution environment of the application program whose actions SROs attempt to project. For example, the data included in the application context 218 may include user name, user type, user's execution environment (such as computer identification, operating system version, or the like), or restrictions or limitations regarding the user's accessibility to one or more options.

In one embodiment, the data structure 202 further includes a third data field 222 including metadata representing a set of semantic rules, where the semantic rules define one or more interactive gestures associated with the metadata in the first data field and the metadata in the second data field. For example, the third data field 222 may include metadata relating to a gesture map 224, metadata relating to a speech act map 226, and metadata relating to a set of context rules 228. As an illustration, user 106 may interact with the SROs 110 in system 100 via interactive gestures, which may include using a mouse to select and drag an icon on a computer desktop, audibly responding to an audio prompt, or otherwise (e.g., pressing keys on a telephone keypad or on a keyboard). Such interactive gestures enable system 100 to map metadata extracted from the selected SROs to a set of available actions to the user for interacting with the processes, including workflows.

In one embodiment, the set of semantic rules are interpreted or evaluated based on the metadata and data relating to the execution environment or context of the application program included in the application context 218. For example, when the SRO is projected out of the application/process/data source, it contains some initial data as context. The UI environment (either a UI that exposes SROs as included in the SROs or provides an additional layer on top of the SROs, such as a form) may assert or retract data into the context. For example, a set of semantic rules may evaluate the user name/type data and assert such data in the UI prior to applying the set of semantic rules to interpret user's interactive gestures to extract a set of available actions to the user from the selected SRO. In another example, a set of semantic rules may evaluate an action and determine that such action can only be used once. As such, the UI would not provide the action to the user.

While data structure 202 includes data fields having metadata in the illustrated types, other metadata types or data having information relating execution of processes within application programs 112 or an execution environment of the processes may be included without departing from the scope of the invention. In addition, while embodiments of the invention use metadata as exemplary data type, other data configuration or organization that describes every element managed and/or executed at the time of execution of data such that there is no need for recompilation of data before execution may be used without departing from the scope of the invention.

Figure 3:
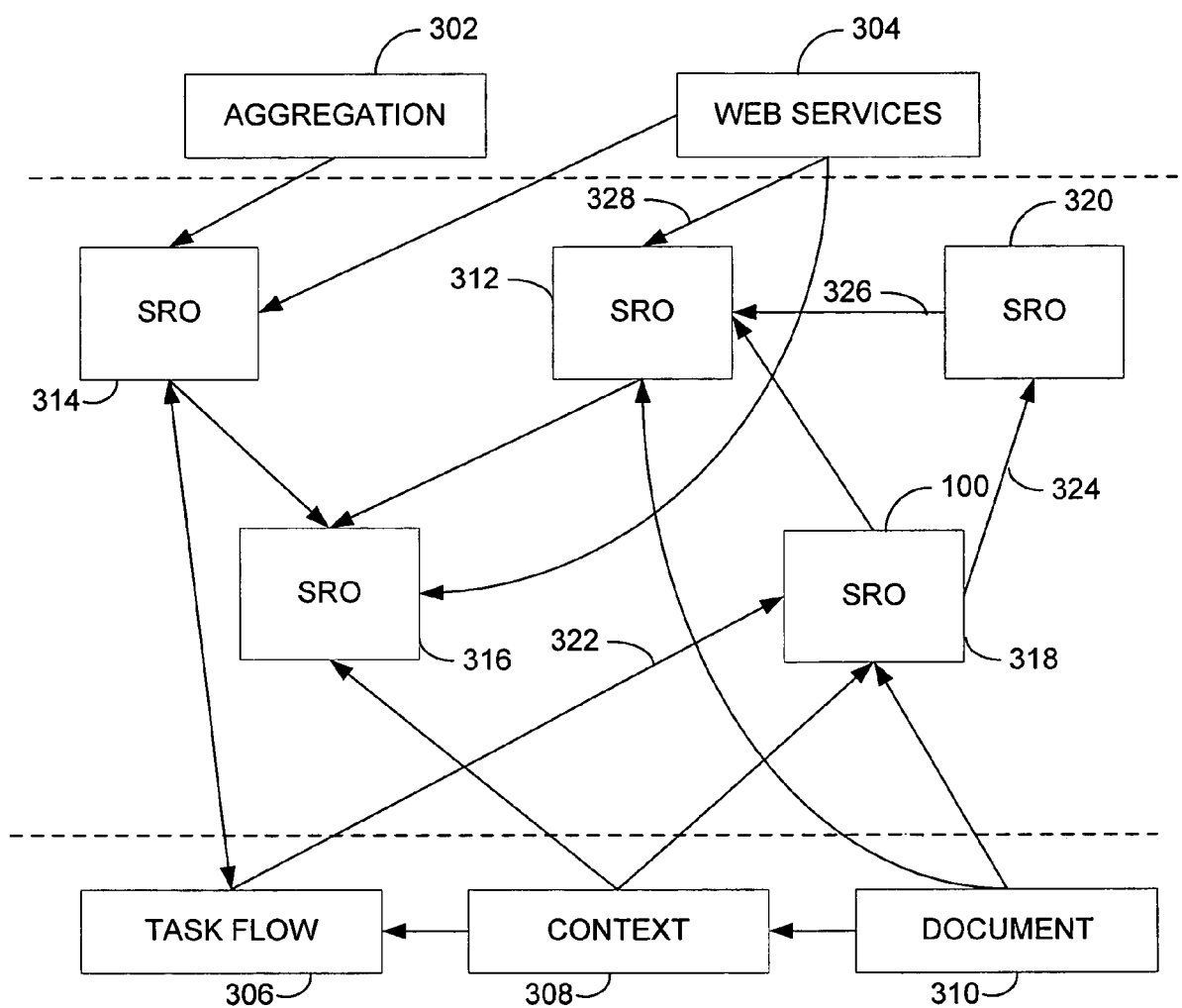
FIG. 3 is an exemplary block diagram illustrating functionalities represented by metadata of SROs according to one embodiment of the invention.

To further illustrate SROs, FIG. 3 is a block diagram describing functionalities represented by metadata of SROs according to one embodiment of the invention. In the illustrated embodiment, for example, processes such as an aggregation application 302, a web service application 304, a task flow application 306, a context space application 308, and a document application 310 include one or more actions. Also, one or more SROs 312, 314, 316, 318, and 320 are used such that aspects or actions of the application programs are exposed. Advantageously, aspects of the invention expose functionalities among the various applications through the use of SROs. For example, the task flow application 306 may transmit a task event to the SRO 318 via arrow 322, which may be represented by a user creating a task. As the user creates the task event in the SRO 318 and assigns the task to an individual to perform the task, the SRO 318 generates a role event to the SRO 320 via arrow 324 which then in turn generates an action event to the SRO 312 via arrow 326. As such, according to aspects of the invention, each SRO is versatile and may be used by different and various application programs to respond to different events or actions.

Still referring to FIG. 3, arrows between applications and SROs illustrated in FIG. 3 represent exemplary semantic relationships between the SROs and the applications. For example, an arrow 328 from the web services application 304 to the SRO 312 may indicate web services application 304 exposes action or events through the SRO 312 to a user (e.g., the user 106). In another example, an arrow 324 from the SRO 318 to the SRO 320 may indicate that a task is assigned to a regional manager of a store. As such, by representing one or more actions in the process through types of SROs to expose functionalities of the process of the application program, system 100 provides a dynamic user experience to user 106.

Figure 4:
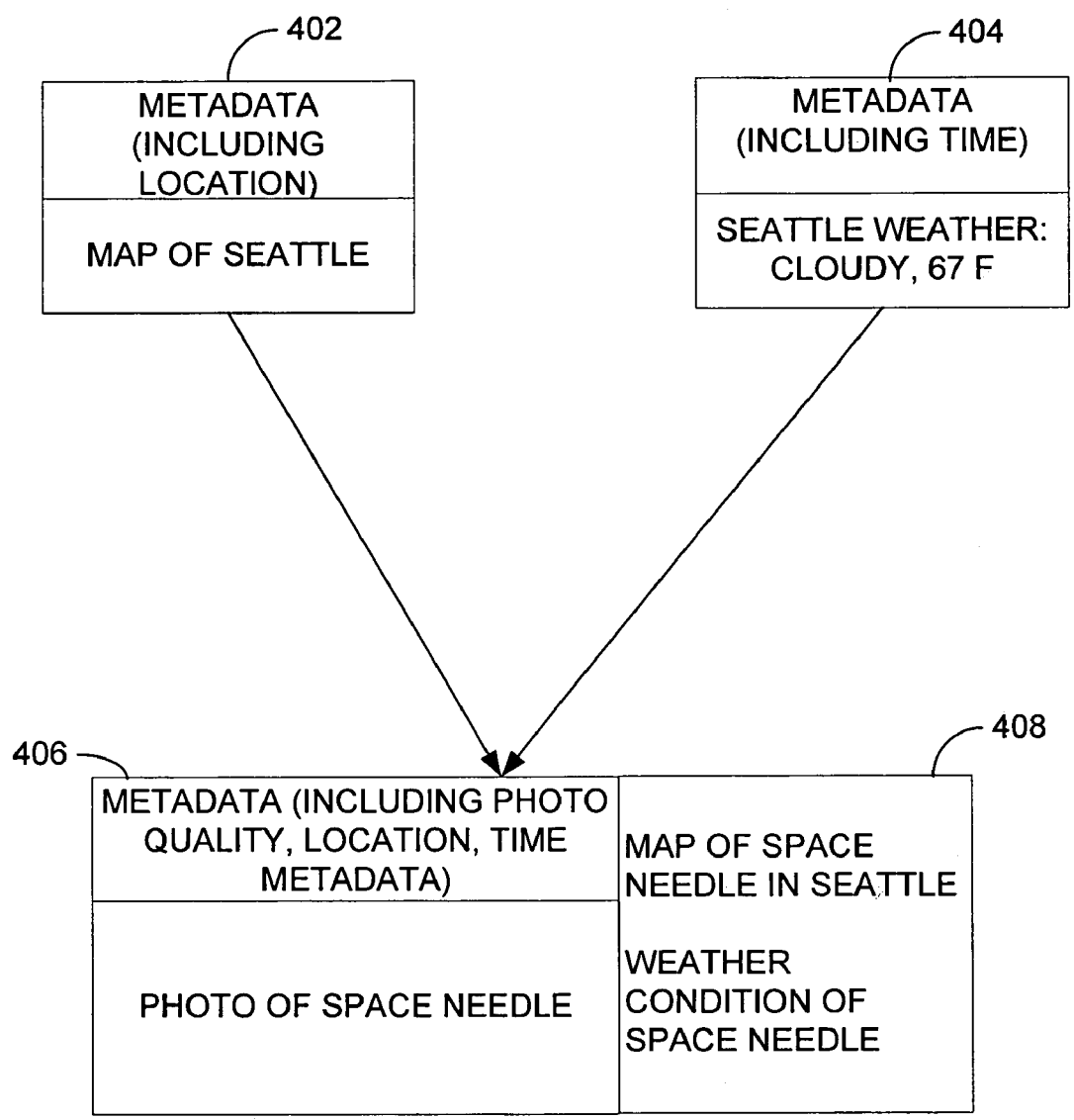
FIG. 4 is an exemplary block diagram illustrating a dynamic user experience by extracting metadata from SROs according to one embodiment of the invention.

To illustrate a relatively simple dynamic user experience, FIG. 4 is a block diagram illustrating extraction of metadata from SROs according to one embodiment of the invention. For example, as illustrated in FIG. 4, a map type SRO 402 includes metadata relating to a location. In this illustrated example, the map type SRO 402 represents a map of Seattle. Still referring to FIG. 4, a weather type SRO 404 includes metadata relating to time. As illustrated, the weather type SRO 404 indicates the weather condition of Seattle at 10:00 am on Jun. 3, 2005 is cloudy with a temperature of 67° F.

When user 106 selects or obtains a photo of the Space Needle, a popular tourist location in Seattle, the photo of the Space Needle is represented by a photo type SRO 406 which includes metadata relating to photo quality, time, and location. As such, by representing the photo type SRO 406 using metadata and by extracting the metadata from the photo type SRO 406, the map type SRO 402, and the weather type SRO 404, user 106 may be presented with a box or window 408 which includes a map with the location of the Space Needle relative to Seattle, a global position satellite (GPS) location of the Space Needle relative to Seattle, current weather condition surround the Space Needle, and/or a forecast of weather conditions surrounding the Space Needle. In an alternative embodiment, the use of SROs enables the user to take additional actions with respect of the Space Needle, such as request travel details or purchase the map of the Space Needle.

Figure 5:
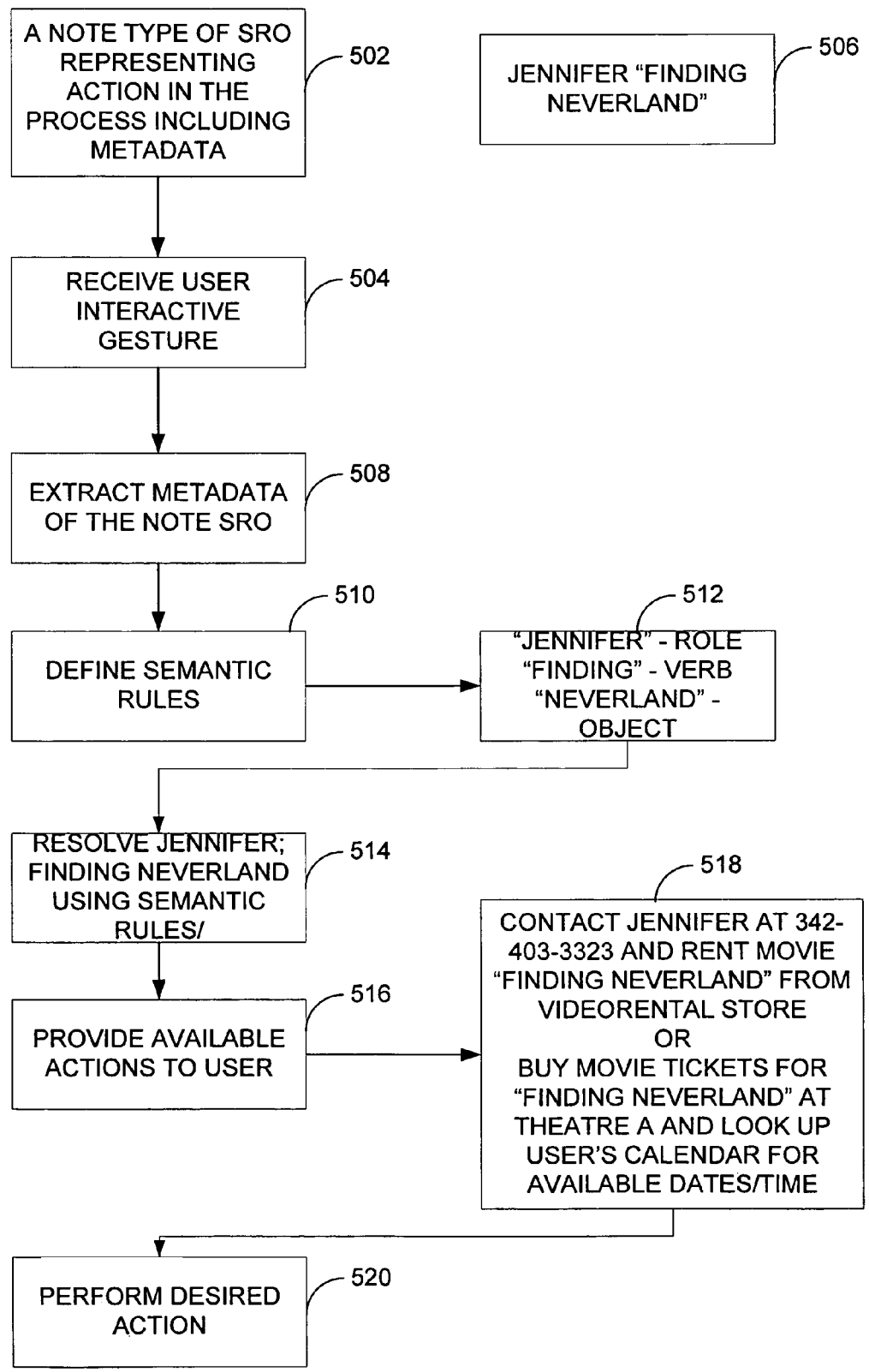
FIG. 5 is an exemplary flow diagram illustrating a method of providing a dynamic user experience within a process using semantic rich objects (SROs) according to one embodiment of the invention.

Referring now to FIG. 5, a flow chart illustrates a method of providing a dynamic user experience within a process using semantic rich objects (SROs) according to one embodiment of the invention. In particular, FIG. 5 illustrates one example of user interactive gestures using a keyboard. Initially, at 502, a note type SRO 506 represents one or more actions in the process including metadata associated with actions and an execution environment therefor. At 504, interface 104 receives an interactive gesture from user 106 for selecting at least one of the SROs to perform a desired action in the process. In the illustrated example, user 106 enters through the keyboard the text: "Jennifer 'Finding Neverland'" with respect to the note type SRO 506. The desired action of user 106 may be to watch "Finding Neverland" with Jennifer. At 508, system 100 extracts the metadata from note type SRO 506 to determine whether the desired action is available in the execution environment of the process in response to the received interactive gesture.

In this determination, processor 102 may first define a set of semantic rules at 510 to evaluate or interpret the interactive gesture "Jennifer 'Finding Neverland'". As discussed above, each SRO carries with it some data (such as in the application context 218 in the second data field 216) that are used to evaluate a set of semantic rules. In one example, some of the data in the application context 218 may be projected by the application program, and some may be asserted/retracted by the UI environment (e.g. by the form that hosts SROs). The defined semantic rules may identify "Jennifer" as referring to a role type SRO while "Finding Neverland" may refer to a location type SRO. After determining "Finding Neverland" does not refer to a location, the defined semantic rules may further identify "Finding Neverland" as a name of an object, such as a document, a title of a file, or the like. As such, system 100 may search through available files stored in memory 108 or access data from application programs to determine the semantic meaning of "Finding Neverland" as a text or media object type SRO. As system 100 continues to resolve "Jennifer" and "Finding Neverland" using semantic rules at 514, system 100 provides a set of available actions to perform the desired action at 516. In one embodiment, an SRO includes with it codes, routines, or computer-executable instructions in the first data field 204 such as, the action available codes 206, the action execution codes 208, or the like. For example, the codes may be used to cause the action to be executed. In another example, the code may be complex code such as, if the action is provided by a web service, in which case the action execution code may need to know how to communicate with the web service.

In this example, system 100 determines that Jennifer is an instance of a role type SRO in the user's personal contact list (e.g., address book, email contact list, or other communication contact list) and "Finding Neverland" is a title of a motion picture. As such, at 518, system 100 provides a set of available actions such as "Contact Jennifer at 342-403-3323 and Rent movie 'Finding Neverland' from VideoRental store" or "Buy movie tickets for 'Finding Neverland' at Theater A and User is available on Saturday and Sunday from 4:00-10:00 pm according to User's calendar and Theater A's show time. In other words, instead of having user 106 to select Jennifer from user's phone book to find her phone number, browse on the Internet to determine if the title "Finding Neverland" is available, or look up the location of Theater A and determine the available show time, system 100 provides user 106 a dynamic, contextual, and interesting user experience. Therefore, the user 106 is not limited to the standard or even custom-coded actions provided by the application programs. Instead, SROs use metadata to expose functionalities and actions of the processes in application programs and provide user 106 with actions in a simple and plain language.

In one embodiment, user's interactive gestures, including speech acts (see Appendix A for further detail), are mapped to metadata of SROs such that system 100 may extract metadata from the selected SROs to determine the desired action in response to a combination of visual and audio interactive gestures.

In another alternative embodiment, the user generates one or more events via the interactive gestures, such as mouse clicks, mouse movement across the display, or the like. The system 100 receives or intercepts the events from the user and maps these events to actions exposed through the metadata of the SROs, according to a set of semantic rules. As the metadata is extracted from the SROs by the system 100, a set of available actions are presented to the user in response to the interactive gestures. The system 100 may optionally execute or perform the available actions.

Figure 6A:
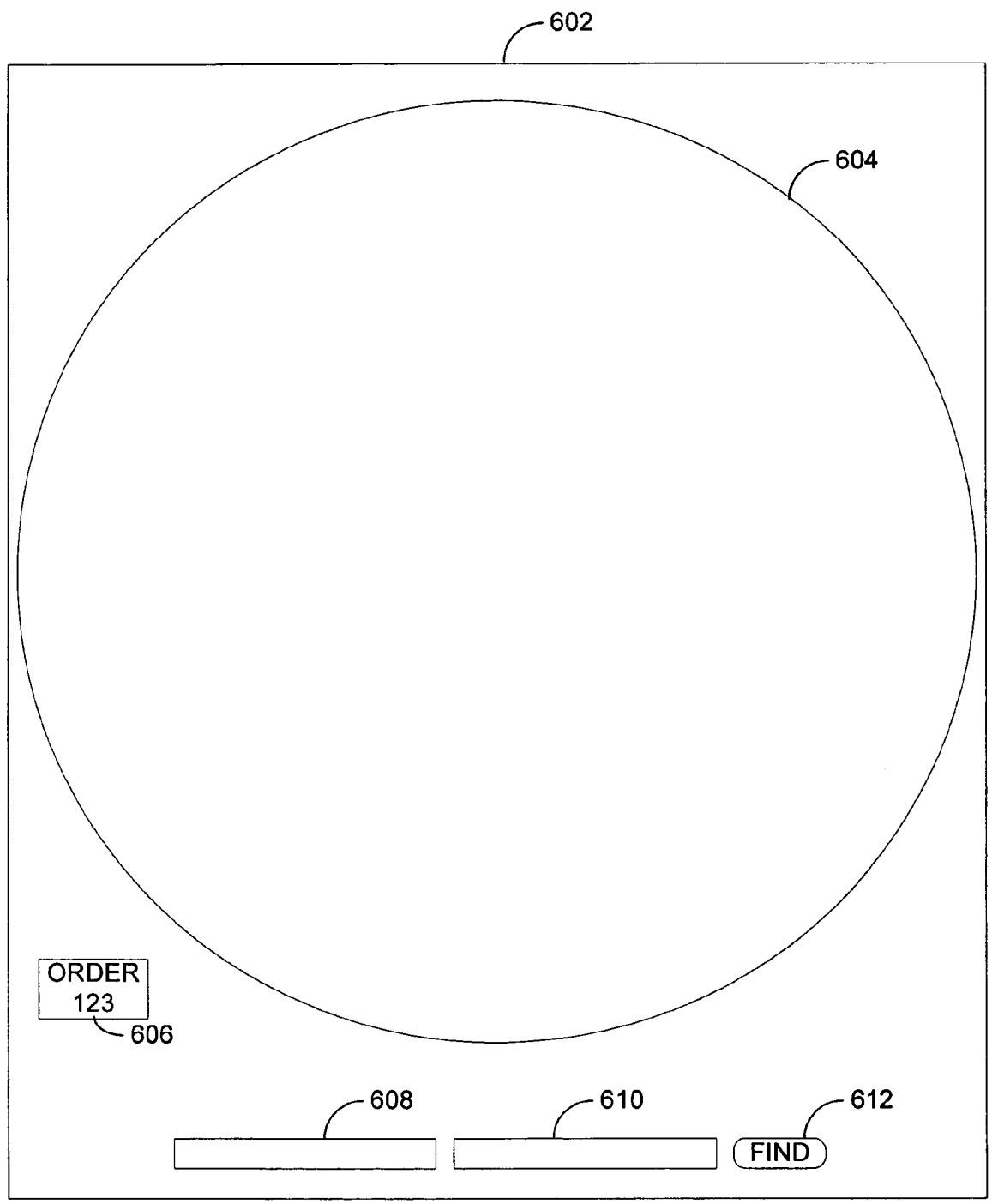
FIGS. 6A-6C are block diagrams illustrating providing a set of available actions in response to an interactive gesture from a user using pointing device (e.g., a mouse) according to one embodiment of the invention.
Figure 6B:
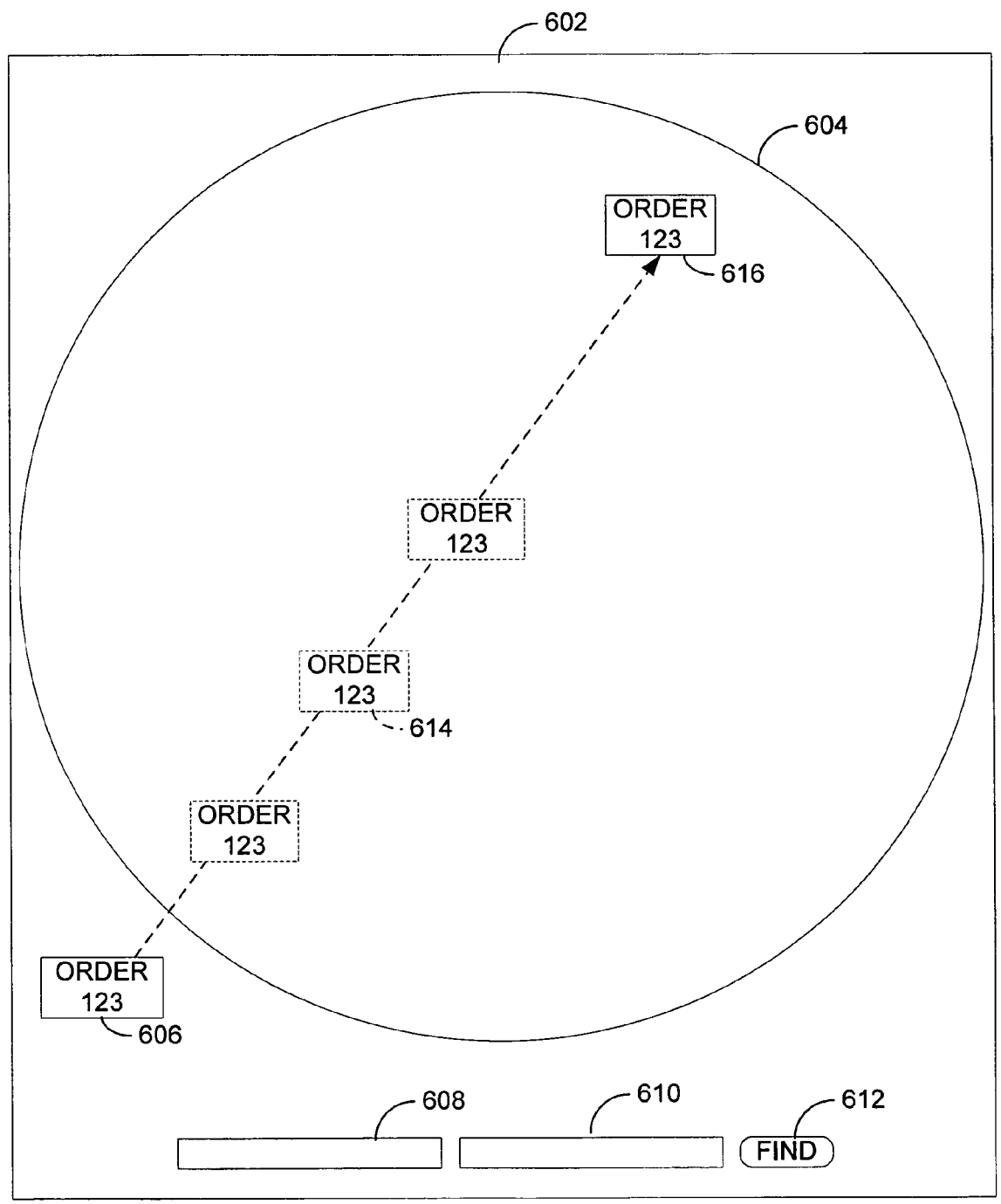
Figure 6C:
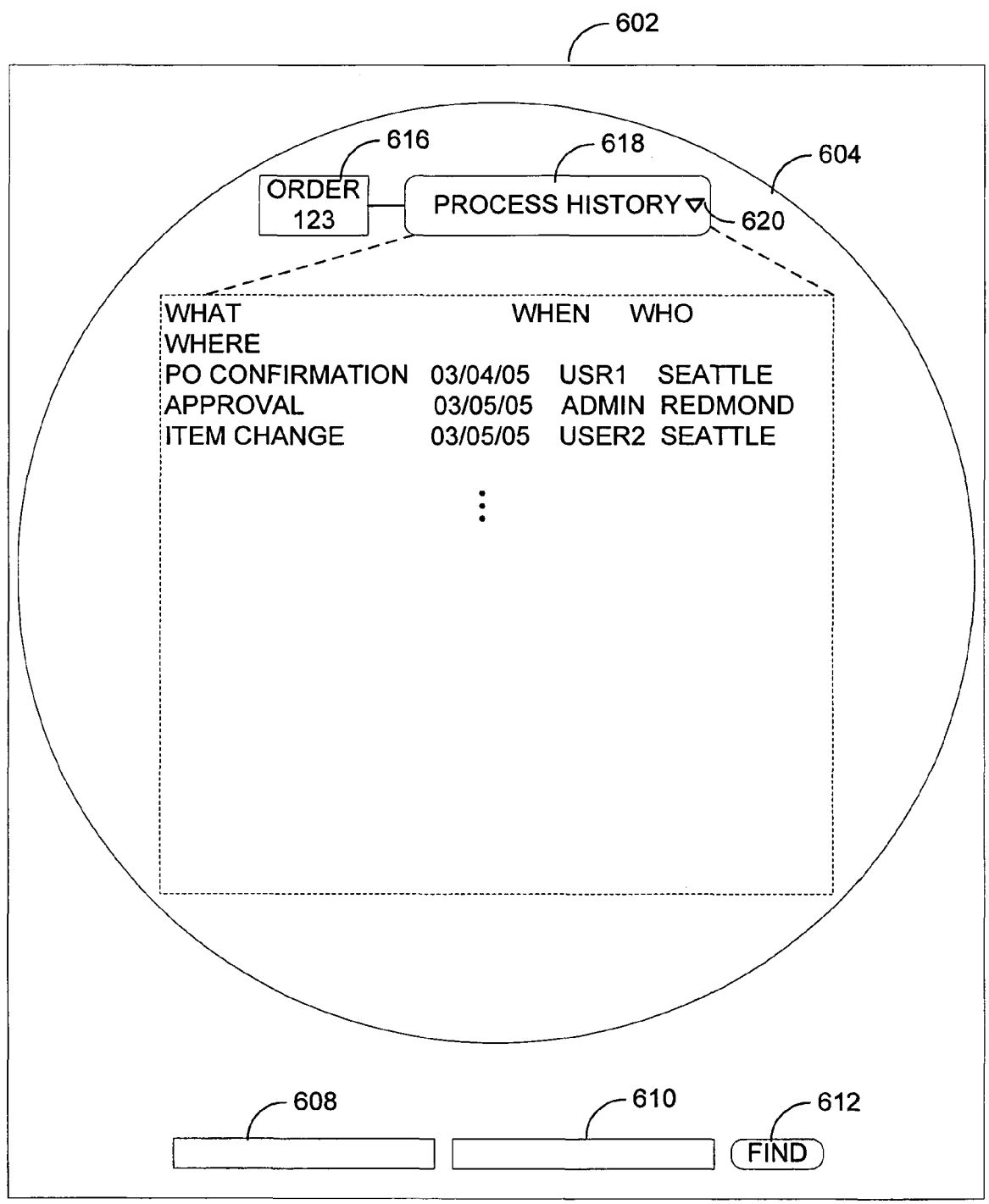

FIGS. 6A to 6C are block diagrams further illustrating providing a set of available actions in response to an interactive gesture from a user using pointing device (e.g., a mouse) according to one embodiment of the invention. In this example, interactive gestures through the pointing device may include:

Clicking to activate something;
Dragging/dropping one object onto another to perform some operation;
Right-clicking to learn more about something or to get more options,
"Boxing" to group objects or perform a common operation over all of them; or
Searching for something via a non-hierarchical metaphor, and scrolling through results and possibly navigating to them.

FIG. 6A illustrates a display area 602 and an operational space 604 for providing a set of available actions to user 106. An icon or an event object 606 represents an SRO. In this example, the event object 606 represents an "order 123". The display area 602 also includes search entry fields 608 and 610 where a query may be executed when user 106 presses a "find" button 612.

Referring now to FIG. 6B, user 106 uses the pointing device to first select event object 606, drag event object 606 (an phantom event object 614 indicates dragging movement by user 106), and drop event object 606 inside the operational space 604 as an event object 616. In one embodiment, such drag-and-drop interactive gesture may be mapped to metadata of SROs according to the following rule:

Rule 1: <Subject, UIgesture, Object, Environment, DefaultActionSet>

Under this rule, an interactive gesture (e.g., "drag/drop") is bound to a subject SRO (e.g., a Sales Report) and a object SRO (e.g., a Business Colleague) within an execution environment (e.g., operational space 604).

Alternatively, the drag-and-drop interactive gesture of user 106 may be mapped to metadata of SROs according to the following rule:

Rule 2: <Subject, Action, SpeechAct>

In this example, the actions available on a subject SRO are mapped to a SpeechAct, such as, request, inform, or command.

In another alternative embodiment, the user 106 may use an interactive gesture, such as a drag-and-drop mouse action to associate one SRO with one or more other SROs to compose a set of available actions as a semantic sentence that includes actions or behaviors represented by the one SRO and the one or more other SROs. For example, the user 106 may select an SRO X that may be in response to the interactive gesture of the user 106 such that actions or behaviors exposed by the metadata may be composed to for a sentence, such as "assign task A to user B and send reminder to user B's immediate supervisor upon completion of the task by user B."

In FIG. 6C, a set of available actions 618 is displayed or provided to user 106 after receiving the drag-and-drop interactive gesture from user 106. In this example, which involves a workflow, the set of available actions 618 include "process history" (a down arrow 620 indicates additional actions are available when user 106 points the pointing device at the down arrow 620 or user 106 selects the down arrow 620 using the pointing device). In the displayed "process history", user 106 is presented with a set of information relating to "order 123" as system 100 extracts metadata from "order 123" to determine whether information included in "process history" may be available to user 106.

For example, the process history shows information of the purchase order confirmation of "order 123" on Mar. 4, 2005 by USER1 in Seattle. Note that user 106 did not select an action such as "show process history" or "show purchase order confirmation" initially in FIG. 6A. Instead, user 106 only drags-and-drops event object 606 onto the operational space 604 and system 100 extracts metadata from event object 606 representing "order 123" to provide user 106 with a set of available actions in response to such drag-and-drop interactive gesture to operational space 604. As such, embodiments advantageously provide versatile SROs enhance user experiences without requiring users to memorize or remember shortcuts or options on a form-based menu.

In another embodiment, according to Rule 1, system 100 provides a list of actions available after extracting metadata from the source and target SROs. If a default action set is available, system 100 may modify a previous list according to performance history, prior user interactions, or the like. Alternatively, system 100 may present the entire list of available actions to user 106 from the subject and object SROs.

In yet another embodiment according to Rule 2, system 100 translates available actions according to a set of SpeechActs. In this example, suppose there are three SROs: an SRO representing "User1", another SRO representing "User2" (a colleague), and a third representing a business object relating to "sales numbers for the Western region filtered by business unit"). After selecting the business object, User1 drags the business type SRO over to the SRO representing User2, and drop the business type SRO onto of the SRO representing User2. After receiving such visual interactive gesture, system 100 extracts metadata from metadata from the three SROs and map to audio interactive gesture such as speech acts, user 106 may be provided with the following:

A. Share this business object with User2;

B. Communicate regarding the business object, such as ask User2 a question about validity of the business object; or C. Make User2 a custodian/owner of the business object (or allow User2 certain rights to access the business object).

In one embodiment, user 106 may also combine the drag-and-drop interactive gesture with a text query by inputting search terms in search entry fields 608 and 610. For example, if user 106 frequently uses certain speech acts for particular instances of a particular subject/object pair, system 100 can propose these combinations as new speech acts available on all instances of the subject/object pair. As such, metadata relating to speech acts may be updated with new speech acts based on prior user interaction habits or history. Consequently, embodiments of the invention eliminate the need to design customized code or customized sequence of actions for a user.

In a further alternative embodiment, prior user interactions with execution of the process, a performance history of the execution of the process, and a process execution model may be represented as an SRO having metadata relating to actions of the processes in the application program. As such, actions such as search may be available to a prior user interactions SRO, making the set of available actions to user 106 manageable, query-able, and scalable.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or, other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 4. For example, computer 130 represents one or more actions in the process by semantic rich objects (SROs) for exposing functionality of the process. Each of the SROs includes metadata associated with an action and an execution environment therefor. Computer 130 also receives an interactive gesture from a user for selecting at least one of the SROs to perform a desired action in the process. The computer 130 further extracts the metadata from the selected SROs to determine whether the desired action is available in the execution environment of the process.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above system and method without departing from the scope of the invention, it is intended that all matter contained in the above description and shown in the accompanying drawings shall be interpreted as illustrative and not in a limiting sense.

APPENDIX A

Examples of Speech Acts

Speech acts have a number of characteristics and features. Formally, they involve a speaker, hearer, and the communicative action between them. For example, J. L. Austin and John R. Searle developed a fairly rigorous technical vocabulary to describe speech act theory (SAT)—involving the distinction of three aspects of a speech act (e.g., Searle, John R., *Speech Acts, An Essay in the Philosophy of Language*, Cambridge: Cambridge University Press, 1969):

A. Locutionary Act (what literally was said);

B. Illocutionary Act (what act was performed—e.g. request); and

C. Perlocutionary Act (what it accomplished by the performance—social effect).

Using semantic rules and gestural algebraic operators, person A may click on a SRO representing person B and be given a list of more meaningful, but generic, speech acts:

A. Request PersonB to do something . . . ;

B. Ask PersonB a question;

C. Make a promise/commitment to PersonB to do something;

D. Inform PersonB about something . . . ; or

E. Share resource/object with PersonB.

What is claimed is:

1. A computerized method of providing a dynamic user experience within an application program, said computerized method comprising:

graphically presenting one or more semantic rich objects (SROs) as icons to a user for exposing functionality of the application program, said SROs each having data with a type associated therewith, including metadata therein associated with one or more actions in the application program and including a storage for the data relating to an execution environment for executing the one or more actions, said application program operating externally with respect to the SROs;

identifying an interactive gesture, said identified interactive gesture including selection of at least two different types of the presented SROs in combination from the user via overlapping the icons of the two different types of the presented SROs, said each of the at least two different types of the presented SROs storing data in the storage;

evaluating the stored data from the at least two different types of the presented SROs in the interactive gesture based on a set of semantic rules;

extracting the metadata from the at least two different types of the presented SROs in response to the evaluating;

applying the set of semantic rules to the evaluated data and the extracted metadata;

in response to the applying, generating a semantic format executable by the one or more actions of the application program; and providing at least a portion of the one or more actions of the application program in response to the extracted metadata associated therewith from each of the two different types of the presented SROs as a function of the received data and the generated semantic format.

2. The computerized method of claim 1 wherein each of the SROs further includes code for execution of the action, and wherein extracting the metadata comprises executing the included code to determine whether the desired action is available in the execution environment of the process in response to the received interactive gesture.

3. The computerized method of claim 1 further comprising providing, in response to the received interactive gesture, a set of available actions for the user to interact with the process based on the extracted metadata.

4. The computerized method of claim 3 wherein providing the set of available actions comprises at least one of the following: displaying the set of available actions exposed through the SROs in a form-based user interface and generating a user interface for selectively displaying the set of available actions for the user to interact with the process, and wherein the process includes one or more of the following: an application program, an application software, and a workflow processing application.

5. The computerized method of claim 1 further comprising performing the desired action based on the extracted metadata and the received interactive gesture.

6. The computerized method of claim 1 further comprising providing a plurality of SROs in response to a query from a user, and further comprising correlating the extracted metadata with one or more of the following: a performance history of the execution of the process, prior user interactions with the execution of the process, and a process execution model.

7. The computerized method of claim 1 further comprising composing a set of available actions as a semantic sentence that includes actions represented by the two different types of SROs.

8. The computerized method of claim 1 wherein one or more computer storage media include computer-executable instructions for performing the computerized method recited in claim 1.

9. A system for actively generating behaviors for a user to interact within a process, said system comprising:

a memory for storing one or more semantic rich objects (SROs), each of said SROs including a type and metadata therein corresponding to a behavior and an execution environment therefor, each of said SROs also including data relating to execution of the behavior, said behavior and said execution environment operating externally with respect to the stored one or more SROs;

an interface for presenting the one or more SROs to the user, wherein the interface is further configured for receiving a selection of one or more SROs from the user, wherein the interface receives a user selection for associating one type of SRO with another type of SRO from the user;

a processor for executing computer-executable instructions for:

evaluating the data from the one type of SRO and the data from the other type of SRO in the received user selection based on a set of semantic rules;

in response to the evaluating, extracting the metadata from the one type of SRO and the metadata from the other type of SRO;

generating a set of available behaviors to the user in response to the extracting by selecting at least a portion of behaviors from the one type of SRO and at least a portion of behaviors from the other type of SRO according to the extracted metadata from the one type of SRO and the extracted metadata from the other type of SRO; and wherein the interface provides the generated set of behaviors to the user for interacting with the data in the one type of SRO and the data in the other type of SRO from the user selection and the process in the execution environment.

10. The system of claim 9 further comprising a user interface having a user selection device for receiving the selection of the one or more SROs from the user.

11. The system of claim 9 wherein the processor is further configured to map the received selection from the interface to the stored metadata of each of the SROs.

12. The system of claim 11 further comprising a data structure mapping a set of speech acts to the stored metadata of each of the SROs.

13. The system of claim 9 wherein the processor is configured to compose a set of available actions as a semantic sentence that includes actions represented by the two different types of SROs.

14. The system of claim 9 wherein the processor is further configured to execute the stored data relating to execution of the behavior to generate the set of behaviors based on the stored metadata and the received selection from the interface.

15. The system of claim 9 wherein, the interface is configured to provide one or more SROs in response to a query from the user, selectively provides the generated set of behaviors of the SROs based on the execution environment of the process, and receive a selection of one or more SROs from the user via a form-based user interface, and the processor is further configured to correlate the stored metadata with one or more of the following: a performance history of the execution of the process, the prior user interactions with the execution of the process, and the process execution model.

16. A computer storage medium having stored thereon a data structure for a semantic rich object, said computer storage medium comprising:

an object data field for storing data relating to the semantic rich object, said object data field further storing a type data relating to the stored data of the semantic rich object;

a first data field of the semantic rich object including metadata representing one or more actions associated with a process for operating on the data relating to the semantic object stored in the object data field;

a second data field of the semantic rich object including metadata representing an execution environment of the process for operating on the data relating to the semantic object stored in the object data field, said first data field being associated with said second data field to define a set of available actions to be performed in the execution environment of the process; and a third data field of the semantic rich object including metadata representing a set of semantic rules, said semantic rules defining a semantic format executable by the one or more actions associated with the process based on the one or more interactive gestures associated with the metadata in the first data field and the metadata in the second data field for operating on the data relating to the semantic object stored in the object data field, wherein the semantic rich object is presented to a user graphically as an icon, wherein the set of semantic rules is applied when data in the object data field of a type of the semantic rich objects relates to data in the object data field of another type of the semantic rich objects according to the defined semantic format, and wherein at least a portion from the set of available actions based on the metadata in the first data field of the type of the semantic rich objects and the other type of the semantic rich objects are provided to the user.

17. The computer storage medium of claim 16 wherein metadata in the third data field includes metadata representing a set of interactive gestures and a set of speech acts, said set of interactive gestures and said set of speech acts being mapped to the metadata in the first data field and the metadata in the second data field.

18. The computer storage medium of claim 16 further comprising one or more additional data fields including metadata associated with one or more of the following: a set of process ambient service definition, interactive gesture pins, process extensibility methods, a process object model, a performance history of the execution of the process, the prior user interactions with the execution of the process, execution of the behavior, and a process execution model.

\* \* \* \* \*